United States Patent
Kayyoor et al.

(10) Patent No.: US 10,311,087 B1
(45) Date of Patent: Jun. 4, 2019

(54) SYSTEMS AND METHODS FOR DETERMINING TOPICS OF DATA ARTIFACTS

(71) Applicant: Veritas US IP Holdings LLC, Mountain View, CA (US)

(72) Inventors: Ashwin Kayyoor, Sunnyvale, CA (US); Henry Aloysius, San Jose, CA (US); Bashyam Anant, Saratoga, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 407 days.

(21) Appl. No.: 15/072,384

(22) Filed: Mar. 17, 2016

(51) Int. Cl.
*G06F 16/00* (2019.01)
*G06F 16/28* (2019.01)
*G06F 16/2457* (2019.01)
*G06F 16/35* (2019.01)
*G06F 16/22* (2019.01)

(52) U.S. Cl.
CPC ........ *G06F 16/285* (2019.01); *G06F 16/2228* (2019.01); *G06F 16/24575* (2019.01); *G06F 16/24578* (2019.01); *G06F 16/35* (2019.01)

(58) Field of Classification Search
CPC ......... G06F 17/30572; G06F 17/30011; G06F 17/30321; G06F 17/30861; G06F 17/30731; G06F 17/30589; G06F 17/30705; G06F 17/30528; G06F 17/30598; G06F 17/3061; G06F 17/30625; G06F 17/30734; G06F 16/9535; G06F 16/951; G06F 16/24578; G06F 16/2465; G06F 16/26; G06F 16/2228; G06F 16/334; G06F 16/95; G06F 16/3346; G06F 16/635; G06F 16/68; G06F 16/36; G06F 16/23; G06F 16/282; G06F 16/35; G06F 16/954; G06F 16/00; G06F 16/285; G06F 16/58; G06F 16/9024; G06F 16/20; G06F 16/355; G06F 16/86
USPC .................................................. 707/705–780
See application file for complete search history.

(56) References Cited

U.S. PATENT DOCUMENTS

| | | | | |
|---|---|---|---|---|
| 7,028,250 B2 * | 4/2006 | Ukrainczyk | .......... | G06F 17/218 707/E17.084 |
| 7,065,532 B2 * | 6/2006 | Elder | ...................... | G06F 16/38 |
| 8,301,460 B2 * | 10/2012 | Sasai | ...................... | G16H 15/00 705/2 |

(Continued)

OTHER PUBLICATIONS

DMOZ, https://en.wikipedia.org/wiki/DMOZ, as accessed Jan. 18, 2016, Wikipedia, (Jan. 5, 2004).

(Continued)

*Primary Examiner* — Michelle N Owyang
(74) *Attorney, Agent, or Firm* — FisherBroyles, LLP

(57) ABSTRACT

The disclosed computer-implemented method for determining topics of data artifacts may include (1) extracting at least one initial keyword from a data artifact with an unknown topic, (2) creating a set of keywords by generating a plurality of contextually relevant keywords related to the initial keyword and combining the initial keyword with the contextually relevant keywords to form the set of keywords, (3) retrieving, from a topic processor, at least one list of topics associated with each keyword within the set of keywords, and (4) generating, based on the retrieved topic lists, an ordered list of probable topics of the data artifact. Various other methods, systems, and computer-readable media are also disclosed.

15 Claims, 7 Drawing Sheets

(56) References Cited

U.S. PATENT DOCUMENTS

| | | | | | |
|---|---|---|---|---|---|
| 8,447,110 | B2* | 5/2013 | Inagaki | ............... | G06F 16/35 |
| | | | | | 382/177 |
| 8,935,192 | B1* | 1/2015 | Ventilla | ............... | G06N 5/04 |
| | | | | | 706/46 |
| 9,201,945 | B1* | 12/2015 | Garrett | ............... | G06F 17/277 |
| 2010/0057536 | A1* | 3/2010 | Stefik | ............... | G06F 17/2785 |
| | | | | | 705/14.71 |
| 2011/0270830 | A1* | 11/2011 | Stefik | ............... | G06F 17/30707 |
| | | | | | 707/731 |
| 2015/0356571 | A1* | 12/2015 | Chang | ............... | G06Q 30/0201 |
| | | | | | 705/7.29 |
| 2016/0034514 | A1* | 2/2016 | Singhal | ............... | G06F 16/9535 |
| | | | | | 707/706 |

OTHER PUBLICATIONS

DBpedia, http://wiki.dbpedia.org/, as accessed Jan. 18, 2016, (Oct. 11, 2007).

Wikipedia, https://www.wikipedia.org/, as accessed Jan. 18, 2016, (Jul. 27, 2001).

Textifier, https://www.microsoft.com/en-us/store/p/textifier/9wzdncrdgfn6, as accessed Jan. 18, 2016, Microsoft, (on or before Dec. 7, 2014).

Sudar/Yahoo_LDA, https://github.com/sudar/Yahoo_LDA, as accessed Jan. 18, 2016, GitHub, Inc., (Oct. 13, 2014).

Lintool/Mr.LDA, https://github.com/lintool/Mr.LDA, as accessed Jan. 18, 2016, GitHub, Inc., (on or before 2011).

AlchemyAPI, http://www.alchemyapi.com/, as accessed Jan. 18, 2016, (May 2, 2009).

Symantec Clearwell eDiscovery, http://www.ndm.net/archiving/Symantec/clearwell-ediscovery, as accessed Jan. 18, 2016, (Oct. 15, 2012).

Support vector machine, https://en.wikipedia.org/wiki/Support_vector_machine, as accessed Jan. 18, 2016, Wikipedia, (Feb. 4, 2004).

K-means clustering, https://en.wikipedia.org/wiki/K-means_clustering, as accessed Jan. 18, 2016, Wikipedia, (Sep. 13, 2006).

John Savill, Windows Server 2012 File Classification Infrastructure, http://windowsitpro.com/windows-server-2012/windows-server-2012-fci, as accessed Jan. 18, 2016, (May 29, 2013).

Smartlogic Semaphore, http://www.smartlogic.com/, as accessed Jan. 18, 2016, (Oct. 18, 2000).

Nucleuz, https://www.nucleuz.com/, as accessed Jan. 18, 2016, (Dec. 2, 2001).

Angoss, http://www.angoss.com/, as accessed Jan. 18, 2016, (Oct. 31, 1996).

Google Cloud Prediction API Documentation, https://cloud.google.com/prediction/docs/, as accessed Jan. 18, 2016, Google Cloud Platform, (Dec. 8, 2014).

Datum box, http://www.datumbox.com/, as accessed Jan. 18, 2016, (Feb. 1, 2011).

Latent Dirichlet allocation, https://en.wikipedia.org/wiki/Latent_Dirichlet_allocation, as accessed Jan. 18, 2016, Wikipedia, (Sep. 13, 2006).

Zipf's law, https://simple.wikipedia.org/wiki/Zipf%27s_law, as accessed Jan. 18, 2016, Wikipedia, (Jan. 11, 2012).

* cited by examiner

SYSTEMS AND METHODS FOR DETERMINING TOPICS OF DATA ARTIFACTS

BACKGROUND

Millions of digital documents are being created and stored each day, ranging in topic from essays to financial transaction logs to personal health histories to patent applications, and thousands of other topics besides. Many organizations have access to large quantities of documents created and stored for a variety of purposes. Unfortunately, these documents aren't always categorized in a useful and sensible manner. Finding documents related to a particular topic may be difficult when searching through a data store of thousands of documents that may not be indexed, categorized, or summarized.

Topic mining is an activity that results in the extraction of topics from an unstructured data artifact such as a document. Because documents are typically a loosely structured sequence of words and other symbols, the problem is non-trivial. Many traditional topic mining systems may be based on coarse-grained techniques that need to operate on a large number of documents in order to group the documents into multiple clusters where each cluster represents a particular latent topic. This is an expensive process; moreover, traditional systems may not assign human-readable topic names to the clusters. Accordingly, the instant disclosure identifies and addresses a need for additional and improved systems and methods for determining topics of data artifacts.

SUMMARY

As will be described in greater detail below, the instant disclosure describes various systems and methods for determining topics of data artifacts by generating sets of keywords related to the data artifacts and then calculating lists of topics based on the keywords.

In one example, a computer-implemented method for performing such a task may include (1) extracting at least one initial keyword from a data artifact with an unknown topic, (2) creating a set of keywords by generating a group of contextually relevant keywords related to the initial keyword and combining the initial keyword with the contextually relevant keywords to form the set of keywords, (3) retrieving, from a topic processor, at least one list of topics associated with each keyword within the set of keywords, and (4) generating, based on the retrieved topic lists, an ordered list of probable topics of the data artifact.

In one embodiment, the computer-implemented method may further include generating, at the topic processor, the list of topics by (1) identifying a topic hierarchy for a topic, (2) creating a suffix index for the topic by, for each element in the topic hierarchy, (a) designating the element as a key and (b) copying each element that is above the element in the topic hierarchy into a topic space indexed on the key, (3) retrieving a subset of the elements in the topic space of at least one key in the suffix index, and (4) designating the retrieved subset as the list of topics. In one embodiment, creating the suffix index may include designating, for each element in the topic space of each key, a depth level of the element. In this embodiment, retrieving the subset of the elements may include receiving a requested depth level as input and composing the subset exclusively of elements with a depth level equal to the requested depth level.

In one embodiment, generating, based on the retrieved topic lists, the ordered list of probable topics of the data artifact may include (1) calculating a set of topic frequencies, where each frequency within the set of topic frequencies includes a frequency with which a given topic occurs in the retrieved topic lists, (2) calculating a set of frequency frequencies, where each frequency within the set of frequency frequencies includes a frequency with which the frequency occurs in the set of topic frequencies, (3) designating at least one frequency as a favorable frequency based on an analysis of the set of frequency frequencies, (4) identifying at least one topic that occurs at the favorable frequency in the retrieved list of topics, and (5) adding the topic to the ordered list of probable topics. In some examples, performing the analysis of the set of frequency frequencies may include designating at least one most frequently occurring frequency as an unfavorable frequency and designating at least one least frequently occurring frequency as an unfavorable frequency.

In some examples, generating the contextually relevant keywords may include retrieving at least one keyword from at least one predetermined external source of contextually relevant keywords. In one embodiment, the data artifact may include a group of documents and extracting at least one initial keyword from the data artifact may include summarizing the documents into a concise summary that is smaller in length than the total length of the documents and extracting at least one initial keyword from the concise summary. In one embodiment, the ordered list of probable topics may include, for each topic in the ordered list of probable topics, a percentage indicating the likelihood that the topic accurately describes the data artifact.

In one embodiment, a system for implementing the above-described method may include (1) an extraction module, stored in memory, that extracts at least one initial keyword from a data artifact with an unknown topic, (2) a creation module, stored in memory, that creates a set of keywords by generating a group of contextually relevant keywords related to the initial keyword and combining the initial keyword with the contextually relevant keywords to form the set of keywords, (3) a retrieval module, stored in memory, that retrieves, from a topic processor, at least one list of topics associated with each keyword within the set of keywords, (4) a generation module, stored in memory, that generates, based on the retrieved topic lists, an ordered list of probable topics of the data artifact, and (5) at least one physical processor configured to execute the extraction module, the creation module, the retrieval module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) extract at least one initial keyword from a data artifact with an unknown topic, (2) create a set of keywords by generating a group of contextually relevant keywords related to the initial keyword and combining the initial keyword with the contextually relevant keywords to form the set of keywords, (3) retrieve, from a topic processor, at least one list of topics associated with each keyword within the set of keywords, and (4) generate, based on the retrieved topic lists, an ordered list of probable topics of the data artifact.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
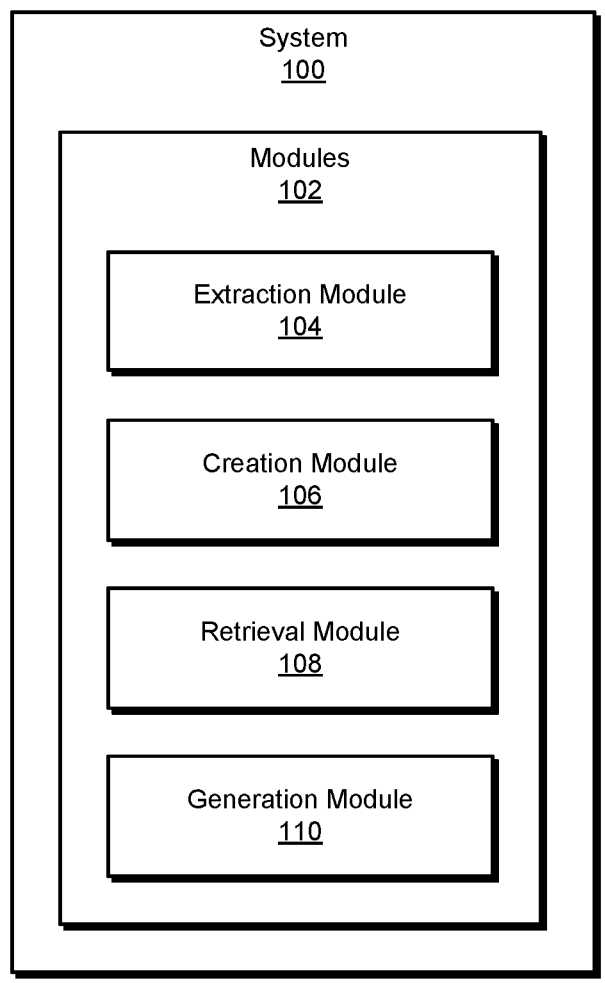
FIG. 1 is a block diagram of an exemplary system for determining topics of data artifacts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining topics of data artifacts. As will be explained in greater detail below, by generating topic lists based on suffix topic indices for multiple keywords extracted from data artifacts, the systems and methods described herein may be able to efficiently and accurately assign topics to large quantities of documents.

The following will provide, with reference to FIGS. 1, 2, 4, and 5, detailed descriptions of exemplary systems for determining topics of data artifacts. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for determining topics of data artifacts. As illustrated in this figure, exemplary system 100 may include one or more modules 102 for performing one or more tasks. For example, and as will be explained in greater detail below, exemplary system 100 may include an extraction module 104 that extracts at least one initial keyword from a data artifact with an unknown topic. Exemplary system 100 may additionally include a creation module 106 that creates a set of keywords by generating a plurality of contextually relevant keywords related to the initial keyword and combining the initial keyword with the contextually relevant keywords to form the set of keywords. Exemplary system 100 may also include a retrieval module 108 that retrieves, from a topic processor, at least one list of topics associated with each keyword within the set of keywords. Exemplary system 100 may additionally include a generation module 110 that generates, based on the retrieved topic lists, an ordered list of probable topics of the data artifact. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
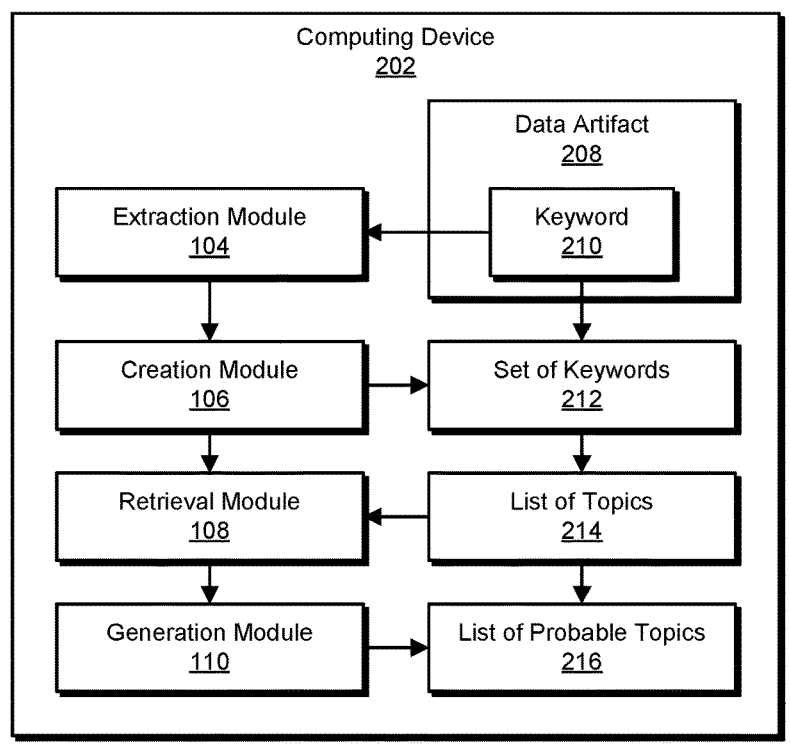
FIG. 2 is a block diagram of an additional exemplary system for determining topics of data artifacts.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to determine topics of data artifacts. For example, and as will be described in greater detail below, extraction module 104 may extract at least one keyword 210 from a data artifact 208 with an unknown topic. Next, creation module 106 may create a set of keywords 212 by generating a plurality of contextually relevant keywords related to keyword 210 and combining keyword 210 with the contextually relevant keywords to form set of keywords 212. After that, retrieval module 108 may retrieve, from a topic processor, at least one list of topics 214 associated with each keyword within set of keywords 212. Finally, generation module 110 may generate, based on the retrieved topic lists, an ordered list of probable topics 216 of data artifact 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
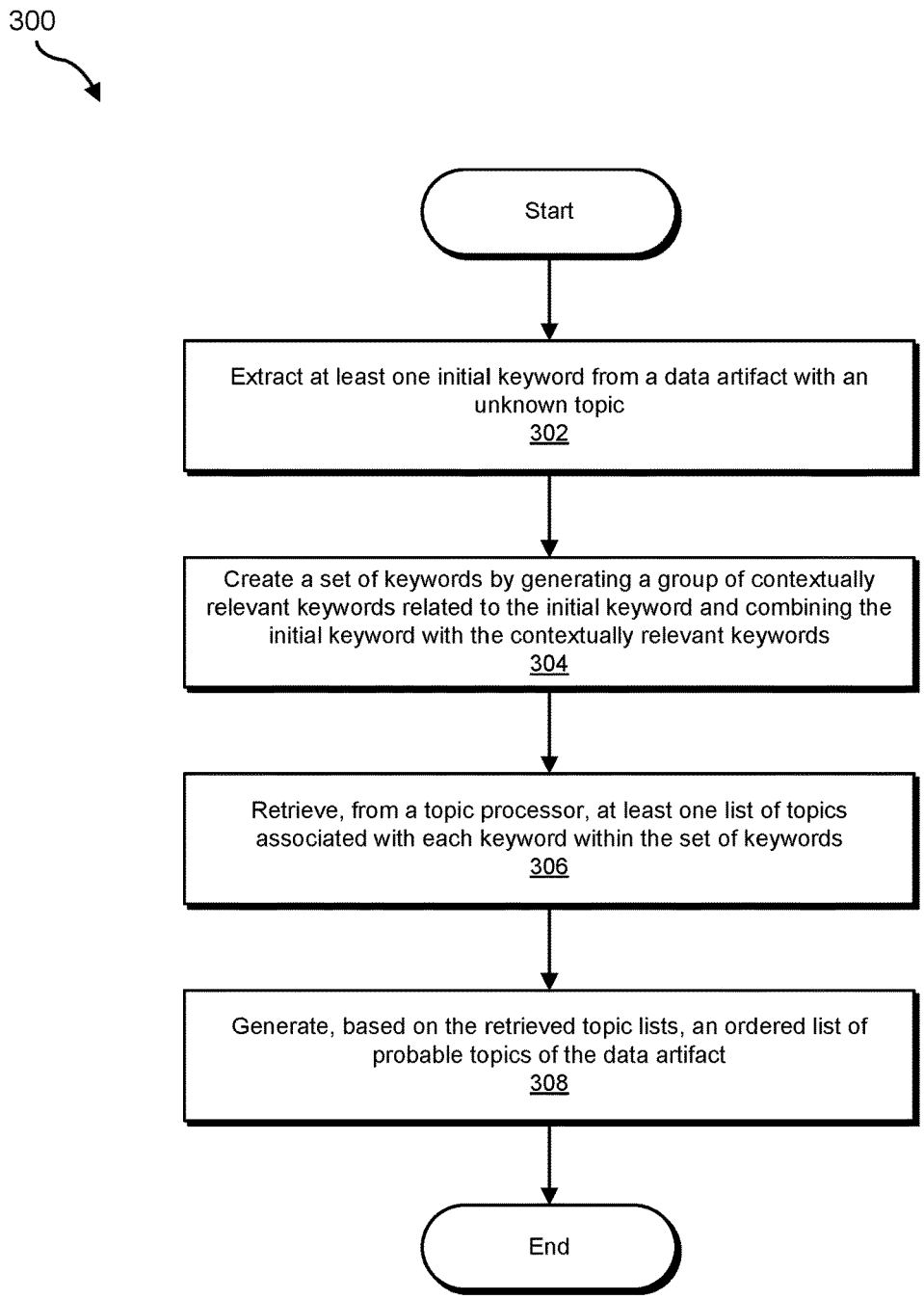
FIG. 3 is a flow diagram of an exemplary method for determining topics of data artifacts.

FIG. 3 is a flow diagram of an exemplary computer-implemented method 300 for determining topics of data artifacts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may extract at least one initial keyword from a data artifact with an unknown topic. For example, extraction module 104 may, as part of computing device 202 in FIG. 2, extract at least one keyword 210 from data artifact 208 with an unknown topic.

The term "data artifact," as used herein, generally refers to any item and/or collection of data. In some embodiments, a data artifact may include a set of documents. In one example, a data artifact may include a cluster of documents created via a natural language processing algorithm such as Latent Dirichlet allocation. Additional examples of data artifacts may include, without limitation, a single document, an email, the title of a document, a word, a phrase, a sentence, a paragraph, a string of characters, a collection of any of the above, and/or a combination of any of the above.

The term "keyword," as used herein, generally refers to any word, phase, and/or string of text characters. In some examples, a keyword may be a data artifact. For example, if the data artifact is a single word, then the initial keyword may be that same word. In some examples, a keyword may be a string of characters, such as "health_files." Additionally or alternatively, a keyword may be a proper noun, such as "United States."

Extraction module 104 may extract keywords from the data artifact in a variety of ways. For example, if the data artifact is a single word, extraction module 104 may identify that word as the initial keyword. In another example, if the data artifact is a file name that includes non-alphanumeric characters, extraction module 104 may parse the file name for extra key words. Additionally or alternatively, if the data artifact is a phrase, sentence, and/or collection of sentences, extraction module 104 may parse the data artifact using one or more natural language processing algorithms in order to extract the words and/or phrases most likely to be relevant keywords.

In one example, the data artifact may include a group of documents and extraction module 104 may extract the keywords by summarizing the group of documents into a concise summary and extracting the keywords from the concise summary. In one embodiment, extraction module 104 may use a pagerank algorithm to create the summary by first tokenizing the documents into multiple sentences, modeling the sentences as nodes in a graph, and using a pagerank algorithm on the resulting graph to determine which sentences are connected to the most other sentences and thus the best candidates for inclusion in the summary. In one embodiment, extraction module 104 may create a concise summary paragraph for each document and then append the summaries. In another embodiment, extraction module 104 may create a concise summary paragraph for all of the documents. Additionally or alternatively, extraction module 104 may create a summary that is a word cloud of words extracted from all of the documents in the group.

At step 304, one or more of the systems described herein may create a set of keywords by generating a plurality of contextually relevant keywords related to the initial keyword and combining the initial keyword with the contextually relevant keywords to form the set of keywords. For example, creation module 106 may, as part of computing device 202 in FIG. 2, create set of keywords 212 by generating a plurality of contextually relevant keywords related to keyword 210 and combining keyword 210 with the contextually relevant keywords to form set of keywords 212.

The term "contextually relevant keyword," as used herein, generally refers to any keywords that may be determined to be relevant to one or more initial keyword. Creation module 106 may generate the set of contextually relevant keywords in a variety of ways. For example, creation module 106 may generate the plurality of contextually relevant keywords by retrieving at least one keyword from at least one predetermined external source of contextually relevant keywords. External sources of contextually relevant keywords may include, without limitation, search engines, wikis, dictionaries, databases, lists, and/or other custom keyword stores. In some embodiments, creation module 106 may create the lists of contextually relevant keywords in order to provide additional context to the initial keyword or keywords.

In some embodiments, different external sources of contextually relevant keywords may have different weights. For example, keywords that are retrieved from a wiki may have a higher weight than keywords that are retrieved from a web search. In some embodiments, a user may specify which external source or sources to use to generate contextually relevant keywords. Additionally or alternatively, creation module 106 may select external sources based on user requirements. For example, if a user requires precision, creation module 106 may select a topic-specific wiki as an external source and/or may not select a web search as an external source. In another example, if a user requires results with low latency, creation module 106 may select a web search with low latency as an external source and/or may not select a wiki with high latency as an external source.

In one embodiment, creation module 106 may include a multi-threaded relevant keywords generator that may generate lists of keywords for each initial keyword by sending each initial keyword to a variety of keyword sources and receiving lists of contextually relevant keywords in return. For example, creation module 106 may send the keyword "arthritis" to a keyword source and may receive the list "infectious, treatment, disease, stiffness, inflammation, syndrome, juvenile" in response.

In some embodiments, creation module 106 may send the lists of contextually relevant keywords to be cleaned (i.e., have data that is less likely to be relevant removed). For example, the topic list "infectious, treatment, disease, stiffness, inflammation, syndrome, juvenile" may be cleaned by removing the keyword "juvenile," which is less likely to be relevant to the topic that the rest of the list is describing. In one embodiment, creation module 106 may use a crowdsourced approach to clean the retrieved topic lists by sending the retrieved topic lists to a crowdsourcing service (e.g., AMAZON MECHANICAL TURK) where users of the crowdsourcing service will clean the retrieved topic list.

At step 306, one or more of the systems described herein may retrieve, from a topic processor, at least one list of topics associated with each keyword within the set of keywords. For example, retrieval module 108 may, as part of computing device 202 in FIG. 2, retrieve, from a topic processor, at least one list of topics 214 associated with each keyword within set of keywords 212.

The term "topic processor," as used herein, generally refers to any module capable of receiving one or more keywords and returning one or more topics associated with the one or more keywords. In some embodiments, a topic processor may include a suffix topic index that may organize hierarchical topic ontologies into a set of keys and topic spaces.

In one embodiment, the systems described herein may generate, at the topic processor, the list of topics by identifying a topic hierarchy for a topic and creating a suffix index for the topic by, for each element in the topic hierarchy, designating the element as a key, and copying each element that is above the element in the topic hierarchy into a topic space indexed on the key. For example, the systems described herein may identify the topic hierarchy "Regional/North America/United States/Illinois/Localities/C/Chicago/." The systems described herein may then designate "North America" as a key, with "Regional" as the sole topic in the topic space for the key "North America." The systems described herein may then designate "United States" as a key with "North America" and "Regional/North America" as topics in the topic space. The systems described herein may also designate "Illinois" as a key, with "United States," "United States/North America," and "United States/North America/Regional" as topics in the topic space, and so forth.

In one embodiment, the systems described herein may also designate, for each element in the topic space of each key, a depth level of the element. For example, the topics for the key "Illinois" may be "United States[1]," "United States/North America[2]," and "United States/North America/Regional[3]," with the superscript indicating the depth level. In this example, the topics for the key "United States" may be designated "North America[1]" and "Regional/North America[2]."

Retrieval module 108 may retrieve the topic list from the topic processor in a variety of ways. In some embodiments, retrieval module 108 may retrieve a subset of the elements in the topic space of at least one key in a suffix topic index and designate the retrieved subset as the list of topics. For example, retrieval module may designate the elements "United States," "United States/North America," and/or "United States/North America/Regional" as the topic list for the keyword "Illinois." In some embodiments, retrieval module 108 may retrieve the topic list by using a partial search. For example, retrieval module may retrieve topics related to "North America" in response to a search for "America."

In one embodiment, retrieval module 108 may include a requested depth level as input and may retrieve a subset exclusively of elements with a depth level equal to the requested depth level. For example, retrieval module 108 may specify a depth level of "2" and may designate "United States/North America" a as topic for the keyword "Illinois." In some embodiments, retrieval module 108 may retrieve elements with a depth level equal to or less than the requested depth level. For example, retrieval module 108 may specify a depth level of "2" and may designate "United States/North America" and "United States" as topics for the keyword "Illinois."

In some embodiments, retrieval module 108 may send the retrieved topic lists to be cleaned of potentially irrelevant topics. In one embodiment, retrieval module 108 may send the retrieved topic list to a crowdsourced service. In some embodiments, retrieval module 108 may use the same crowdsourced service that creation module 106 used to clean the contextually generated keyword lists.

At step 308, one or more of the systems described herein may generate, based on the retrieved topic lists, an ordered list of probable topics of the data artifact. For example, generation module 110 may, as part of computing device 202 in FIG. 2, generate, based on the retrieved topic lists, an ordered list of probable topics 216 of data artifact 208.

Generation module 110 may generate the ordered list of probable topics in a variety of ways. In some embodiments, generation module 110 may generate an ordered list of probable topics that includes, for each topic in the ordered list of probable topics, a percentage indicating the likelihood that the topic accurately describes the data artifact. In one example, an ordered list of probable topics may include, "health 20%, business 14%, computers 12%, science 12%, world 12%, regional 6%, shopping 4%, arts 4%, society 4%, games 2%." In some embodiments, the ordered list of probable topics with percentages may be created by combining all of the topics in the lists of topics using statistical analysis. In some embodiments, the systems described herein may then select the topic with the highest percentage as a topic for the data artifact. For example, the systems described herein may label and/or categorize a data artifact as "health."

In one embodiment, generation module 110 may generate, based on the retrieved topic lists, the ordered list of probable topics of the data artifact by calculating a set of topic frequencies, where each frequency within the set of topic frequencies includes a frequency with which a given topic occurs in the retrieved topic lists. For example, the topic "region" may come up five times and have a frequency of five while the topic "United States" may occur twice and have a frequency of two. Next, generation module 110 may calculate a set of frequency frequencies, where each frequency within the set of frequency frequencies includes a frequency with which the frequency occurs in the set of topic frequencies. For example, there may be three topics that each occur twice, so the frequency of the frequency two may be three. Next, generation module 110 may designate at least one frequency as a favorable frequency based on an analysis of the set of frequency frequencies, identify at least one topic that occurs at the favorable frequency in the retrieved list of topics, and add the topic to the ordered list of probable topics. For example, generation module 110 may designate two as a favorable frequency and thus may add "United States," which has a frequency of two, to the ordered list of probable topics.

Figure 4:
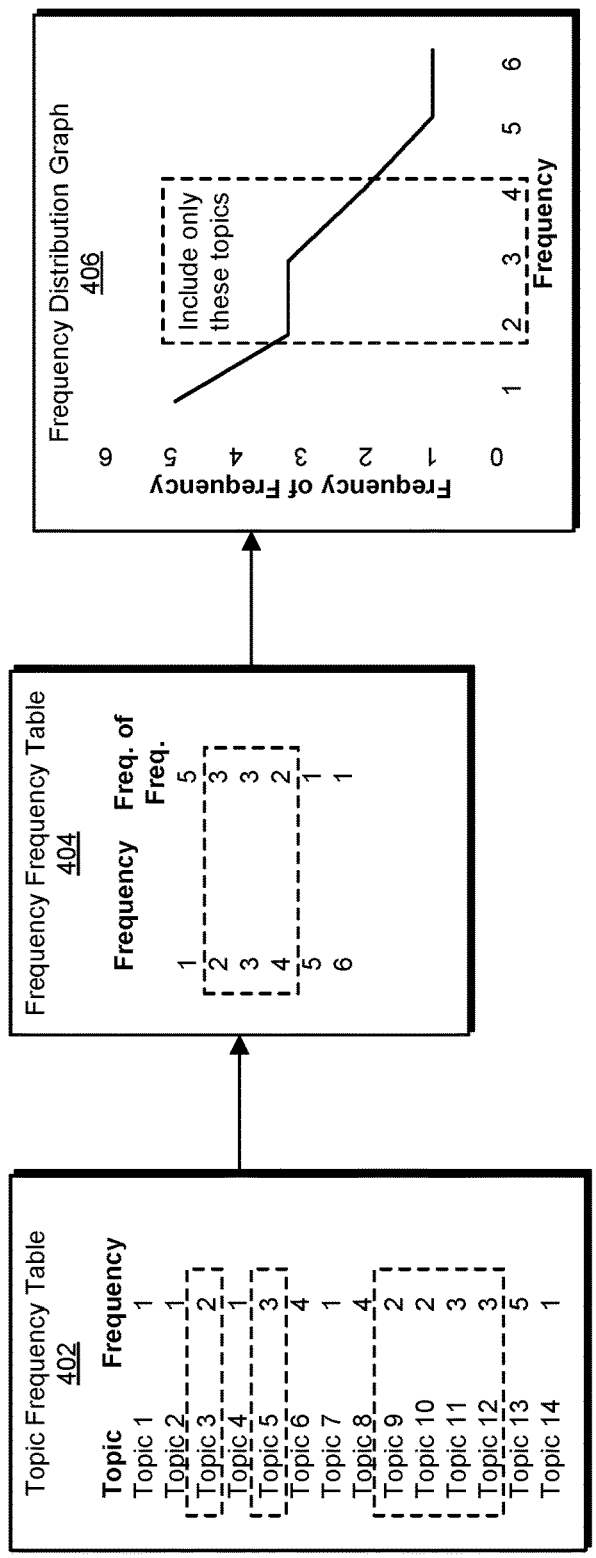
FIG. 4 is a block diagram of an exemplary computing system for determining topics of data artifacts.

An exemplary set of frequency-related tables are illustrated in FIG. 4. As illustrated in FIG. 4, topic frequency table 402 may include a list of topics and the frequency with which they occur in the topic lists retrieved at step 308. In some embodiments, topics may occur more than once if those topics are present in multiple lists. For example, the topic of "medicine" may occur in contextually related keyword lists for the keywords "arthritis," "health," and/or "disease," resulting in the topic of "medicine" having a frequency of three. In some examples, multiple topics may occur at similar frequencies. In one example, frequency frequency table 404 may group the frequencies that occur in topic frequency table 402 by frequency. For example, the frequency "1" occurs five times in topic frequency table 402—five topics each occur only a single time in the retrieved lists of topics—and thus the frequency "1" has a frequency of "5." There are three different topics that each appear twice in topic frequency table 402, and thus the frequency "2" has a frequency of "3."

In some examples, these frequency frequencies may be represented as a graph, such as frequency distribution graph 406. In some embodiments, generation module 110 may generate the analysis of the set of frequency frequencies by designating at least one most frequently occurring frequency as an unfavorable frequency and designating at least one least frequently occurring frequency as an unfavorable frequency. In these embodiments, generation module 110 may remove both the most frequently occurring frequencies and the least frequently occurring frequencies from consideration, including only the topics that occur at moderate frequencies relative to all the other frequencies.

In some examples, generation module 110 may take this step because the most frequently occurring topics may be too vague to be useful. For example, the topics "world," "science," or "humanity" may occur in nearly every list of related topics generated by a topic processor. Similarly, topics that only occur once may not actually be relevant at all. For example, the keyword "juvenile" may appear in a list of keywords related to "arthritis," but topics that are related to the keyword "juvenile" but to none of the other keywords may not be relevant to the contents of a document about arthritis. In this example, topics that are likely to occur in most but not all of the topic lists generated by relevant keywords, such as "medicine" and "health," may be the most accurate topics. These topics may have frequency frequencies that fall in the middle of a frequency distribution graph such as frequency distribution graph 406. Thus, by selecting topics with moderate frequency frequencies, generation module 110 may generate an accurate and precise list of topics.

Figure 5:
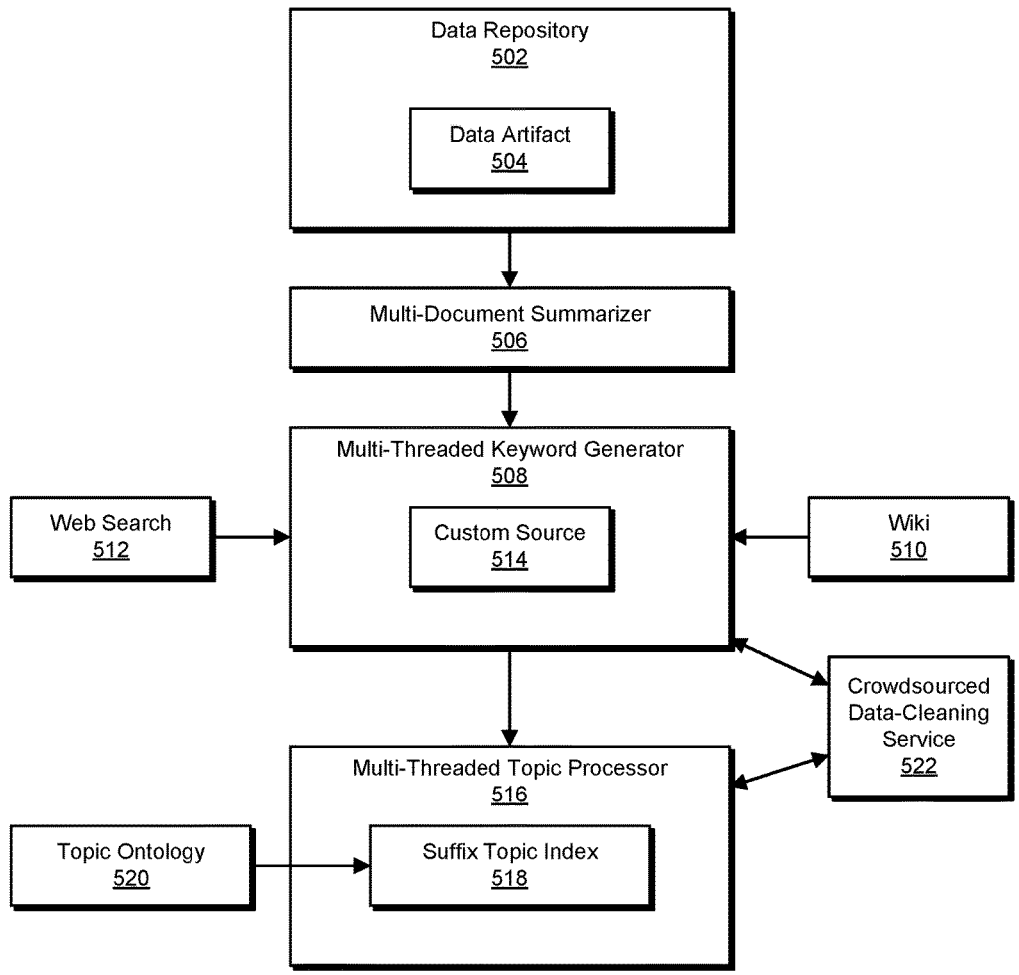
FIG. 5 is a block diagram of an exemplary computing system for determining topics of data artifacts.

In some embodiments, the systems described herein may process a data artifact, keyword list, and/or topic list in a variety of ways to arrive at a topic list. As illustrated in FIG. 5, a data repository 502 may include one or more data artifacts 504. In some embodiments, data repository 502 may represent a data store that stores documents for an organization. In some examples, data artifact 504 may represent a collection of documents. For example, data artifact 504 may represent several documents found in the same folder. In these examples, a multi-document summarizer 506 may produce a summary of data artifact 504. In some embodiments, multi-document summarizer 506 may produce a paragraph from which the systems described herein may generate extra keywords. In other embodiments, multi-document summarizer 506 may produce a keyword cloud.

The systems described herein may then send the resulting keyword or keywords to a multi-threaded keyword generator 508. In some embodiments, multi-threaded keyword generator 508 may use a variety of sources for contextually relevant keywords. For example, multi-threaded keyword generator 508 may use a wiki 510, a web search 512, and/or a custom source 514 to generate lists of keywords. In some embodiments, a crowdsourced data-cleaning service 522 may clean the lists of keywords to remove less relevant keywords.

Next, a multi-threaded topic processor 516 may use the lists of keywords to generate lists of topics. In some embodiments, multi-threaded topic processor 516 may include a suffix topic index 518 that may have created one or more suffix topic indices based on a topic ontology 520. Examples of sources for topic ontology 520 may include, without limitation, DMOZ, DBPEDIA and/or WIKIPEDIA. In one embodiment, crowdsourced data-cleaning service 522 may clean the lists of topics generated by multi-threaded topic processor 516. Finally, the systems described herein may transform the lists of topics generated by multi-threaded topic processor 516 into an ordered list of probable topics.

In some examples, the systems described herein may then use the most probable topic in the ordered list of probable topics to categorize, label, and/or tag the data artifact. Additionally or alternatively, the systems described herein may store the ordered list of probable topics in conjunction with a pointer to the data artifact and/or present the ordered list of probable topics to a user. By quickly assigning topics to data artifacts, the systems described herein may enable the enforcement of data loss prevention rules, optimize data backups, increase the speed of data organization services, and/or improve the efficiency of various other systems.

Figure 6:
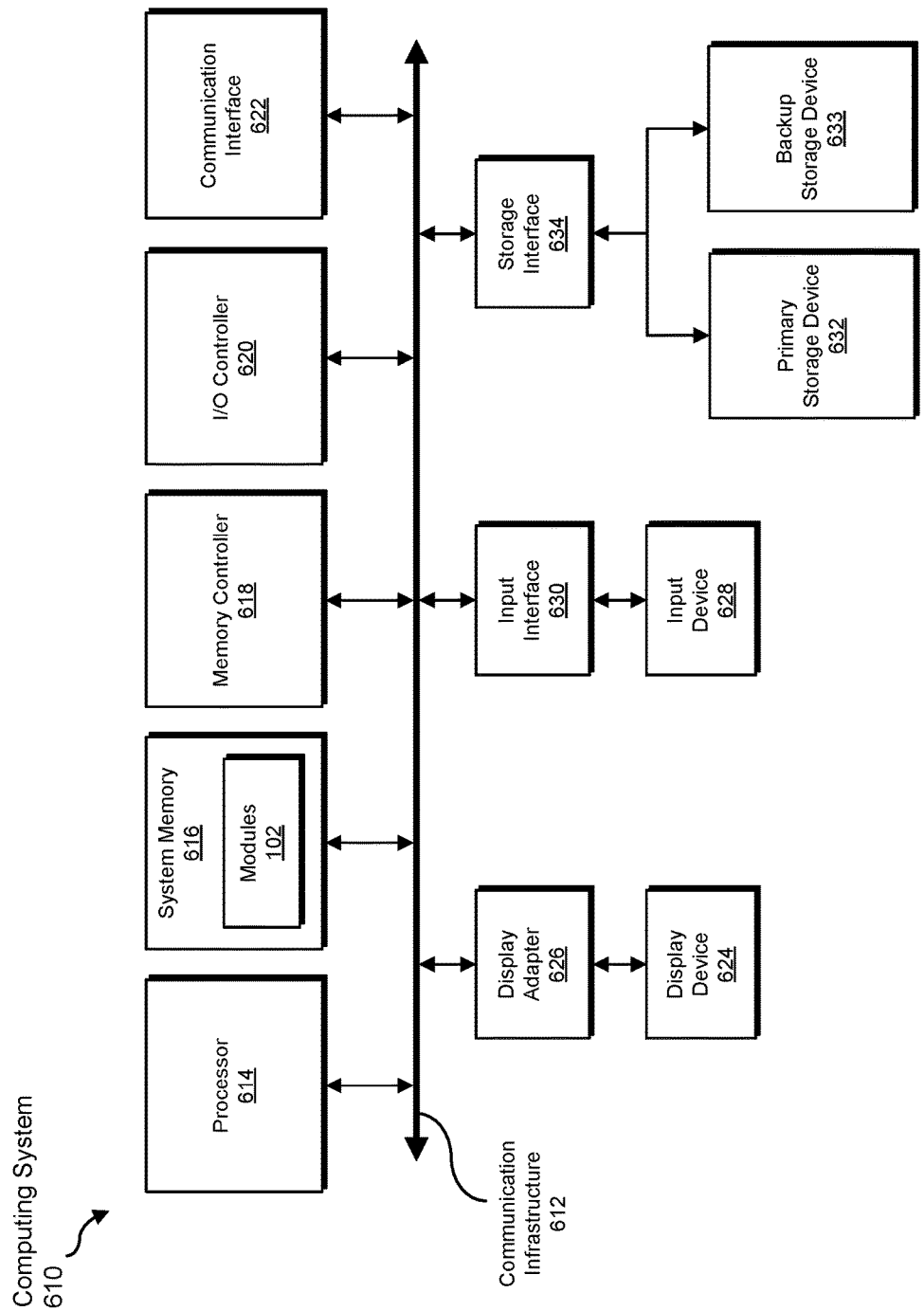
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
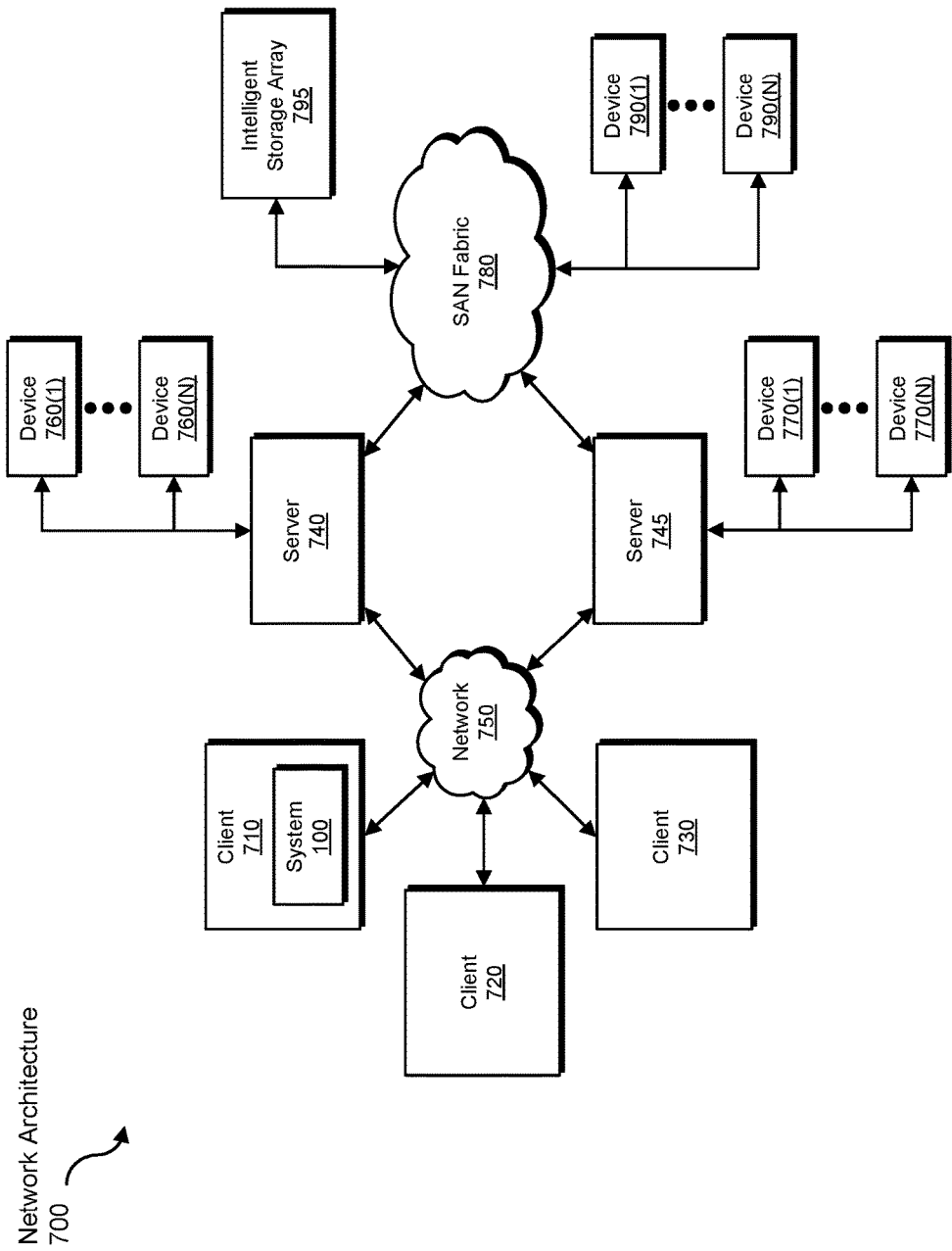
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining topics of data artifacts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data artifacts to be transformed, transform the data artifacts by extracting keywords, output a result of the transformation to a keyword list generator, use the result of the transformation to generate keyword lists, and store the result of the transformation to a topic processor. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining topics of data artifacts, at least a portion of the method being performed by a computing device comprising at least one processor, the method comprising:

extracting at least one initial keyword from a data artifact with an unknown topic;

creating a set of keywords by generating a plurality of contextually relevant keywords related to the initial keyword and combining the initial keyword with the contextually relevant keywords to form the set of keywords;

retrieving, from a topic processor, a plurality of lists of topics, wherein each list of topics describes each keyword within the set of keywords, wherein each list of topics has a corresponding frequency in a topic frequency table;

generating a frequency distribution graph from the retrieved topic lists based on the topic frequency table; and generating, based on the frequency, an ordered list of probable topics of the data artifact by selecting topics in the topic lists falling within the middle of the graph such that the topic with the highest frequency and the topic with the lowest frequency are not included in the ordered list of probable topics.

2. The computer-implemented method of claim 1, further comprising generating, at the topic processor, the list of topics by:
identifying a topic hierarchy for a topic;
creating a suffix index for the topic by, for each element in the topic hierarchy: designating the element as a key;
copying each element that is above the element in the topic hierarchy into a topic space indexed on the key;
retrieving a subset of the elements in the topic space of at least one key in the suffix index;
designating the retrieved subset as the list of topics.

3. The computer-implemented method of claim 2, wherein:
creating the suffix index comprises designating, for each element in the topic space of each key, a depth level of the element;
retrieving the subset of the elements in the topic space of the at least one key in the suffix index comprises:
receiving a requested depth level as input;
composing the subset exclusively of elements with a depth level equal to the requested depth level.

4. The computer-implemented method of claim 1, wherein generating the plurality of contextually relevant keywords comprises retrieving at least one keyword from at least one predetermined external source of contextually relevant keywords.

5. The computer-implemented method of claim 1, wherein:
the data artifact comprises a plurality of documents;
extracting the least one initial keyword from the data artifact comprises:
summarizing the plurality of documents into a concise summary that is smaller in length than the total length of the plurality of documents;
extracting the at least one initial keyword from the concise summary.

6. A system for determining topics of data artifacts, the system comprising:
an extraction module, stored in memory, that extracts at least one initial keyword from a data artifact with an unknown topic;
a creation module, stored in memory, that creates a set of keywords by generating a plurality of contextually relevant keywords related to the initial keyword and combining the initial keyword with the contextually relevant keywords to form the set of keywords;
a retrieval module, stored in memory, that retrieves, from a topic processor, a plurality of lists of topics, wherein each list of topics describes each keyword within the set of keywords, wherein each list of topics has a corresponding frequency in a topic frequency table;
a generation module, stored in memory, that:
generates a frequency distribution graph from the retrieved topic lists based on the topic frequency table; and
generates, based on the frequency, an ordered list of probable topics of the data artifact by selecting topics in the topic lists falling within the middle of the graph such that the topic with the highest frequency and the topic with the lowest frequency are not included in the ordered list of probable topics; and
at least one physical processor configured to execute the extraction module, the creation module, the retrieval module, and the generation module.

7. The system of claim 6, wherein the generation module generates, at the topic processor, the list of topics by:
identifying a topic hierarchy for a topic;
creating a suffix index for the topic by, for each element in the topic hierarchy:
designating the element as a key;
copying each element that is above the element in the topic hierarchy into a topic space indexed on the key;
retrieving a subset of the elements in the topic space of at least one key in the suffix index;
designating the retrieved subset as the list of topics.

8. The system of claim 7, wherein generation module:
creates the suffix index by designating, for each element in the topic space of each key, a depth level of the element;
retrieves the subset of the elements in the topic space of the at least one key in the suffix index by:
receiving a requested depth level as input;
composing the subset exclusively of elements with a depth level equal to the requested depth level.

9. The system of claim 6, wherein the generation module generates the plurality of contextually relevant keywords by retrieving at least one keyword from at least one predetermined external source of contextually relevant keywords.

10. The system of claim 6, wherein:
the data artifact comprises a plurality of documents;
the extraction module extracts the least one initial keyword from the data artifact by:
summarizing the plurality of documents into a concise summary that is smaller in length than the total length of the plurality of documents;
extracting the at least one initial keyword from the concise summary.

11. A non-transitory computer-readable medium comprising one or more computer-readable instructions that, when executed by at least one processor of a computing device, cause the computing device to:
extract at least one initial keyword from a data artifact with an unknown topic;
create a set of keywords by generating a plurality of contextually relevant keywords related to the initial keyword and combine the initial keyword with the contextually relevant keywords to form the set of keywords;
retrieve, from a topic processor, a plurality of lists of topics, wherein each list of topics describes each keyword within the set of keywords, wherein each list of topics has a corresponding frequency in a topic frequency table;
generate a frequency distribution graph from the retrieved topic lists based on the topic frequency table; and
generate, based on the frequency, an ordered list of probable topics of the data artifact by selecting topics in the topic lists falling within the middle of the graph such that the topic with the highest frequency and the topic with the lowest frequency are not included in the ordered list of probable topics.

12. The non-transitory computer-readable medium of claim 11, wherein the one or more computer-readable instructions cause the computing device to generate, at the topic processor, the list of topics by:
identifying a topic hierarchy for a topic;
creating a suffix index for the topic by, for each element in the topic hierarchy:

designating the element as a key;

copying each element that is above the element in the topic hierarchy into a topic space indexed on the key;

retrieving a subset of the elements in the topic space of at least one key in the suffix index;

designating the retrieved subset as the list of topics.

13. The non-transitory computer-readable medium of claim 12, wherein the one or more computer-readable instructions cause the computing device to:

create the suffix index by designating, for each element in the topic space of each key, a depth level of the element;

retrieve the subset of the elements in the topic space of the at least one key in the suffix index by:

receiving a requested depth level as input;

composing the subset exclusively of elements with a depth level equal to the requested depth level.

14. The non-transitory computer-readable medium of claim 11, wherein the one or more computer-readable instructions cause the computing device to generate the plurality of contextually relevant keywords by retrieving at least one keyword from at least one predetermined external source of contextually relevant keywords.

15. The non-transitory computer-readable medium of claim 11, wherein:

the data artifact comprises a plurality of documents;

extracting the least one initial keyword from the data artifact comprises:

summarizing the plurality of documents into a concise summary that is smaller in length than the total length of the plurality of documents;

extracting the at least one initial keyword from the concise summary.

* * * * *